Oct. 6, 1925.
A. R. DE VAINS
1,556,498
PROCESS AND APPARATUS FOR THE CONTINUOUS CHLORINATION
OF CELLULOSIC MATERIALS BY MEANS OF CHLORINE WATER
Filed July 21, 1924
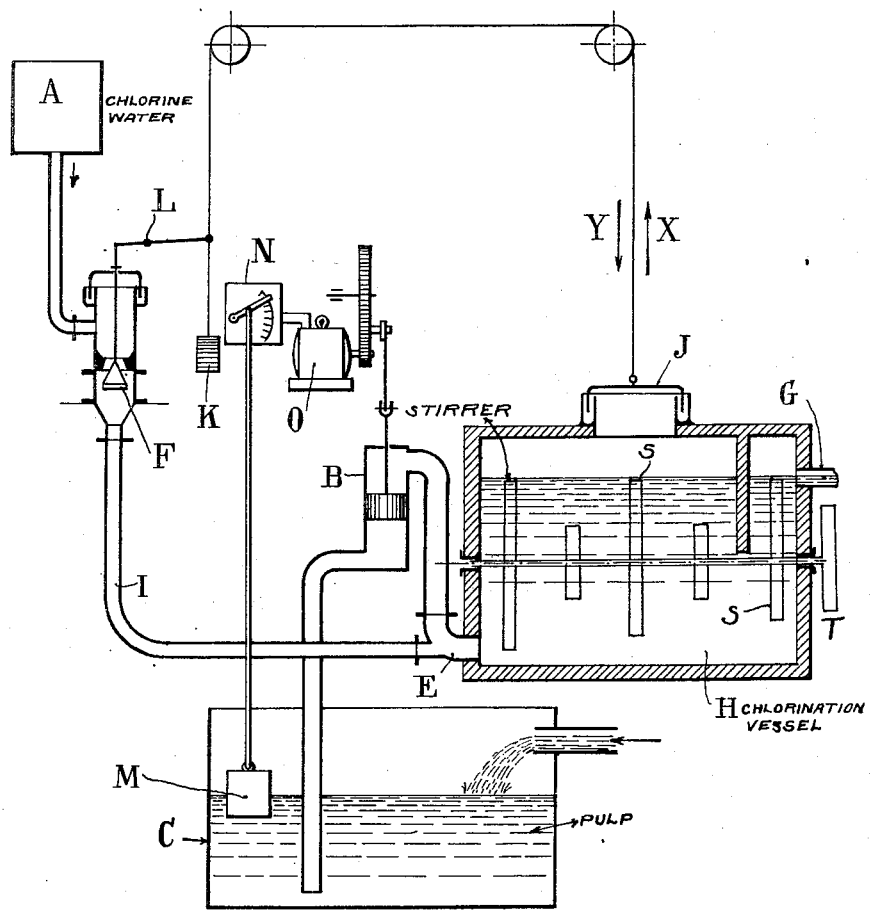
Inventor
Antoine Regnouf de Vains
by Wilkinson & Giusta
Attorneys.

Patented Oct. 6, 1925.

1,556,498

UNITED STATES PATENT OFFICE.

ANTOINE REGNOUF DE VAINS, OF MIRIBEL, FRANCE.

PROCESS AND APPARATUS FOR THE CONTINUOUS CHLORINATION OF CELLULOSIC MATERIALS BY MEANS OF CHLORINE WATER.

Application filed July 21, 1924. Serial No. 727,352.

*To all whom it may concern:*

Be it known that I, ANTOINE REGNOUF DE VAINS, a citizen of the Republic of France, residing at Miribel, Ain, France, have invented new and useful Improvements in Processes and Apparatus for the Continuous Chlorination of Cellulosic Materials by Means of Chlorine Water, of which the following is a specification.

The present invention relates to a process and to an apparatus for the continuous chlorination of cellulosic materials of any kind, the chlorine being in the dissolved state in any suitable solvent.

In order that chlorination shall be effected, the chlorine, preferably in the form of chlorine water, and the material to be treated diluted in water, for example in the proportion of 50 grammes of cellulosic semi-pulp to one litre of water, are both fed continuously and simultaneously either by gravity or by the action of a pump to the chlorination vessel which, owing to its special construction, causes the cellulosic material and the chlorine to remain in intimate contact for a time. The duration of the reaction or the degree of chlorination is thus a function: of the holding capacity of the chlorination vessel, of the delivery of the pump feeding the cellulosic semi-pulp to the chlorination vessel, or of the rate of flow of the chlorine water continuously fed to the chlorination vessel.

It is well known that chlorine dissolves in water at a concentration inversely proportional to the temperature of the latter, and that the chlorine water thus formed is only stable at or below temperatures substantially equal to that at which it was produced. If the temperature increases, the solvent capacity of the water decreases, and chlorine is set free.

It is also known that the chlorination of ligno and pecto-cellulose releases about 49 calories per atom of chlorine fixed on the hydrogen nearest to the active CO group contained in the ligneous or pectic cellulose molecule.

The consequences of the foregoing are:

1. That the temperature of the reacting mass will increase in direct proportion to the quantity of chlorine absorbed by the cellulosic semi-pulp;

2. That if the active CO groups are saturated with chlorine, the temperature within the chlorination vessel will not remain in the neighbourhood of that of the solution of chlorine continuously fed to the chlorination vessel; the chlorine set free in the gaseous state being unable to combine with organic matter, will create a chlorine atmosphere which will be unable to escape.

In this case, an increase of pressure within the apparatus would ensue, which would bring about disturbances in the chlorination of the semi-pulp and in the continuous operation of thé plant. There would inevitably be a leakage of chlorine, hence a loss of reagent and a danger to the workmen.

If, for instance, an excess of solution of chlorine at 15° Centigrade be introduced into a cellulosic semi-pulp already saturated with chlorine, which will thereby attain the temperature of 35° Centigrade, each litre of solution of chlorine fed to the reacting mass will set free 2.43 litres of gaseous chlorine.

To obviate these drawbacks, either the delivery of the pump feeding the pulp to the chlorination apparatus must be increased, or the feed of solution of chlorine must be diminished, in order that, during the same unit of time, the quantities of pulp and of solution of chlorine shall remain chemically proportional to one another.

Since, on the one hand, the semi-pulp to be chlorinated never has a constant composition and, on the other hand the delivery of the apparatus preceding the chlorination vessel is never constant, it is important that the chlorination operation be rendered automatic if it be desired that the pulp shall at all times be uniformly chlorinated.

According to the present invention, the variations in the pressure obtaining in the atmosphere of the chlorination vessel are used for controlling the feed of solution of chlorine, that is to say for diminishing this feed if the pressure increases, and for increasing it, if the pressure diminishes.

Under these circumstances, according to the invention, the degree of chlorination of the cellulosic pulp is only a function of the quantity of solution of chlorine fed to the chlorination vessel and of the holding capacity of the latter, so that the rate of flow of the cellulosic pulp passing through the chlorination vessel can be varied at will, according to requirements. Consequently, a further object of the invention is the provision of means permitting the delivery of the pump feeding the chlorination vessel to be varied according to the output of the apparatus preceding the chlorination vessel in the manufacture of cellulose. For this purpose, a stock vat where the pulp accumulates as it is delivered from the apparatus in which the preliminary treatment takes place, is interposed between said apparatus and the chlorination vessel. In the said vat is provided a float, which by suitable means, increases or diminishes the delivery of the pump drawing from this vat.

The invention is shown diagrammatically and by way of example in the annexed drawing.

In the drawing, a pump B draws in by suction the material to be treated, stored in a stock vat C; the pulp is forced through an inlet E into a chlorination vessel H and flows out through the outlet G; the inlet E also receives the solution of chlorine from a reservoir A by means of a suitable piping I in which a valve F is inserted. When an excess of solution of chlorine enters, the chlorine set free in the chlorination vessel H produces an increase of pressure inside the latter and acts on a bell seal J balanced by a counterweight K, thereby causing the said bell seal to move upwards as shown by the arrow X.

The bell seal J acts upon a lever pivoted at L controlling the valve F through the intermediary of the cable connecting it to the counterweight K. This valve F can completely cut off the supply of solution of chlorine from the reservoir A, but it is easily seen that the opening and closing of the valve F are controlled by the displacements of the bell seal J, that is to say by the pressure of the chlorinated atmosphere in the chlorination vessel H. The reaction will thus be automatically controlled.

When the supply of solution of chlorine is too great, the pressure in H increases, the bell seal J rises and the valve F closes. When, on the contrary, the supply of solution of chlorine is insufficient, the layer of chlorinated air formed in the upper part of the chlorination vessel will give up all its chlorine to the pulp and a decrease of pressure will thus be formed which will produce a movement of the bell seal J in the downward direction shown by the arrow Y. Hence, the admission valve F will be opened and a greater quantity of chlorine solution will be fed to the chlorination vessel.

In the stock vat C is provided a float M responding to the fluctuation of the level of the pulp. This float is connected, by means of a system of amplifying levers, to the handle of the induction regulator N of a motor O actuating the pump B. The arrangement is such that, when the level of the pulp rises in the stock vat C, the float M actuates the regulator N, so as to increase the speed of the motor O and of the pump B and vice-versa. It is obvious that other means could be devised for causing the fluctuations in the level of the pulp to act upon the delivery from the pump B. In the vessel H, I may provide a suitable stirring device, illustrated conventionally at S, operated for example by pulley T.

The invention has only been described in an explanatory way but not in a limitative way, and it is obvious that it might be carried out in many ways without necessarily departing from the spirit thereof.

For instance, it might be possible to act, by means of the balanced bell-seal, on levers controlling the supply of water or of any other solvent of chlorine to the apparatus in which chlorine solution is being prepared or else the balanced bell-seal might be made to control the supply of chlorine to the apparatus in which the chlorine is to be dissolved.

I claim:

1. The process for the continuous chlorination of cellulosic materials consisting in continuously introducing a chlorinating agent and the said materials into a chlorination vessel, in making the supply of said chlorinating agent dependent upon the pressure inside said chlorination vessel, and in discharging the chlorinated product at the same rate as that at which the said materials are introduced into said vessel.

2. The process for the continuous chlorination of cellulosic materials consisting in continuously introducing a chlorinating agent and the said materials into a chlorination vessel, in making the supply of said chlorinating agent dependent upon the pressure inside said chlorination vessel, in stirring the contents of said vessel, and in discharging the chlorinated product at the same rate as that at which the said materials are introduced into said vessel.

3. The process for the continuous chlorination of cellulosic materials consisting in continuously introducing a chlorinating agent and the said materials into a chlorination vessel, in making the supply of said materials dependent upon the rate at which they flow from an apparatus in which they are prepared, in making the supply of the chlorinating agent dependent upon the pressure inside said chlorination vessel, and in continuously discharging the chlorinated product at the same rate as that at which said materials are introduced into the chlorination vessel.

4. The process for the continuous chlorination of cellulosic materials consisting in continuously introducing a chlorinating agent and the said materials into a chlorination vessel, in making the supplying of said materials dependent upon the rate at which they flow from an apparatus in which they are prepared, in making the supply of the chlorinating agent dependent upon the pressure inside said chlorination vessel, in stirring the contents of said vessel, and in continuously discharging the chlorinated product at the same rate as that at which said materials are introduced into the chlorination vessel.

5. An apparatus for the continuous chlorination of cellulosic materials comprising in combination: a chlorination vessel, a supply pipe for a chlorinating agent, a valve in said pipe, means for automatically controlling said valve according to the pressure inside said vessel, means for feeding cellulosic materials to said vessel and means for discharging said materials from said vessel.

6. An apparatus for the continuous chlorination of cellulosic materials comprising in combination: a chlorination vessel, a supply pipe for a chlorinating agent, a valve in said pipe, a bell-seal mounted on said vessel, a connection between said valve and said bell-seal capable of adjusting the condition of the valve relatively to the position of the bell, means for feeding cellulosic materials to said vessel and means for discharging said materials from said vessel.

ANTOINE REGNOUF de VAINS.